Patented Dec. 10, 1935

2,023,981

UNITED STATES PATENT OFFICE 2,023,981

PROCESS FOR BREAKING PETROLEUM EMULSIONS

Charles N. Stehr, Alhambra, Calif., assignor to Tretolite Company, Webster Groves, Mo., a corporation of Missouri No Drawing. Application November 12, 1934, Serial No. 752,716

6 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occuring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings."

The object of my invention is to provide a novel, inexpensive and efficient process for separating emulsions of the kind referred to into their component parts of oil and water or brine.

Briefly described, my process consists in subjecting a petroleum emulsion of the water-in-oil type, to the action of a treating agent or demulsifying agent of a particular composition hereinafter described, thereby causing the emulsion to break down and separate into its component parts of oil and water or brine, when the emulsion is permitted to remain in a quiescent state after such treatment, or subjected to an equivalent separatory step.

The treating agent or demulsifying agent contemplated by my process is of the kind that employs a conventionally blown oil derived from a mixture of castor oil and sardine oil, within certain definite limits hereinafter specified.

Conventionally blown castor oil has been used in the demulsification of crude oil emulsions. It may be used in the manner described in U. S. Patent No. 1,929,399, dated October 3, 1933, to Fuchs. Conventionally blown castor oil or other similar oils may be used in specific mixtures of the kind described in co-pending patent application, Serial No. 715,773 to De Groote and Wirtel, filed March 16, 1934. Conventionally blown caster oil or similar materials may be employed in peculiar mixtures of the kind described in my co-pending application for Patent Serial No. 752,713, filed November 12, 1934.

Although conventionally blown oils, as distinguished from super-oxidized oils of the kind described in my co-pending application for Patent Serial No. 752,714, applied for November 12, 1934, may be prepared from oils other than castor oil, such as corn oil, rape oil, cottonseed oil and the like, and such blown oils may be suitable in the arts for the purposes for which blown oils were originally intended, i. e., for use in lubricants, for plasticizers of artificial leather, and the like, yet I have not found such blown oils, that is, conventionally blown oils derived from cottonseed oil, rapeseed oil and the like, to be suitable for demulsification of crude oil emulsions.

Similarly, I have not found that blown oils derived solely from sardine oil have any value in the breaking of oil field emulsions. Marine oils, such as sardine oils, are characterized by being unsaturated, and in that respect are somewhat similar to drying oils, such as linseed oil, perilla oil and the like. I have not found the blown oils derived from the conventional blowing of mixtures of castor oil and 20% to 40% of linseed or castor oil and 20% to 40% of perilla oil to be of any marked value in demulsification of crude oils. Indeed, if enough linseed oil or the like be present, the product may become leathery in character. Similarly, well known marine animal oils, such as whale oils, when mixed with castor oil and subjected to the conventional blowing process, do not yield a suitable reagent for use in breaking oil field emulsions.

Notwithstanding the fact, however, that other oils of somewhat similar characteristics, when mixed with castor oil and subjected to the conventional blowing process, do not yield a blown oil of value for the purpose of breaking crude oil emulsions, yet I have found when mixtures of castor oil and sardine oil, in which the castor oil constitutes 60 to 80% of the mixture, are subjected to the conventional blowing process, there is obtained a blown oil of marked value for breaking oil field emulsions. I know of no explanation why sardine oil should enjoy this peculiar property, whereas other somewhat similar oils apparently do not exhibit it. Blown sardine oil alone is not an appreciably effective demulsifying agent. However, blown oil of the herein-described character may be more effective on other emulsions than blown castor oil. Insofar as there has been some controversy as to the actual composition of sardine oil, it may be that the explanation lies in the fact that the ultimate composition of sardine oil is different from those oils which appear to have a somewhat similar composition. Instead of using castor oil or sardine oil, one may obviously use fatty acids derived from the same, or a mixture of fatty acids and glycerides. I have found that if the mixture contains 40 to 80% castor oil and the remainder, sardine oil, that such a mixture is very suitable, after conventional blowing process, for use as a reagent in my present process. I prefer to use a mixture in which 75% of castor oil is mixed with 25% of sardine oil. I particularly prefer to use the deodorized, domestic sardine oil, because I have found it to give the best results. Such a mixture is blown in the same manner as castor oil is conventionally blown. The resultant product is characterized by the fact that it has an increased specific gravity and viscosity, in comparison with the original oils, but that it is still oily in nature, rather than semi-livery. Such a product is further distinguished by the fact that it must be subjected to further oxidation before it approaches the point where it exhibits insolubility in kerosene.

It is also a peculiar fact that the blown oil derived by simultaneous oxidation of such mixture acts differently, and in most instances, more effectively than mixtures of blown oils derived by oxidation of each oil separately with subsequent mixtures in comparable proportions to those indicated previously. I believe that during the oxidation process, chemical combination takes place between derivatives of the various raw materials, so as to produce compounds of a kind which could not originate in a mechanical mixture of blown oils. The character of the reactions which occur during the oxidation or manufacture of blown oils is not fully understood. An indication of the possible character of such reactions generally, is described in co-pending application for patent of De Groote, Keiser and Wirtel, filed November 12, 1934, Serial No. 752,719.

My preferred reagent is prepared in the following manner:

150 lbs. of castor oil is mixed with 50 lbs. of deodorized domestic sardine oil, heated to 150° C., and blown by agency of air, with a rise in temperature of not over 100° C., until one obtains a thick, viscous oil, having a higher specific gravity than the original product, and showing marked demulsifying action when tested on crude oil emulsions. Such a product should not show any semi-livery consistency, and should be capable of, or susceptible to further oxidation without showing any insolubility in kerosene. It is mixed with an equal volume of kerosene, and then triethanolamine is added in a quantity sufficient to neutralize any acidic hydrogen. The product is then ready for use.

I do not find it desirable to treat the blown oils of the kind herein described with caustic soda or caustic potassium in the same manner. Such procedure may not only neutralize the acidic hydrogen, but in addition thereto esters or compounds of allied structure may be saponified. I find it most desirable either to use a blown oil as such, or after the addition of triethanolamine or the like, because there is no danger of decomposing any esters or ester-like bodies.

Blown oils of the kind herein mentioned may be used alone, or may be used in mixture with other well-known demulsifying agents, or even in combination with unacted upon fatty bodies. I particularly find it advantageous to use blown oils of the kind herein described in the peculiar combinations contemplated in my co-pending application Serial No. 752,713, filed November 12, 1934. It is understood that this blown oil may be mixed with any suitable solvent, such as petroleum hydrocarbon distillates, including kerosene, gasoline, etc.; coal tar distillates including benzol, solvent naphtha, xylene, etc., or one may employ any of the suitable solvents conventionally employed in the demulsification of demulsifying agents.

The superiority of the reagent or demulsifying agent contemplated by my process is based upon its ability to treat certain emulsions more advantageously and at a somewhat lower cost than is possible with other known demulsifiers, or conventional mixtures thereof. It is believed that the particular demulisifying agent or treating agent herein described will find comparatively limited application, so far as the majority of oil field emulsions are concerned, but I have found that such a demulsifying agent has commercial value, as it will economically break or resolve said oil field emulsions in a certain number of cases which cannot be treated as easily and at so low a cost with the demulsifying agents heretofore available.

In practising my process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500 above referred to, may be required. In treating fresh emulsion, i. e., emulsions that will yield readily to the action of chemical demulsifying agents, the ratio of 1:30,000, above referred to, may be sufficient to produce highly satisfactory results. In general, I have found that for an average petroleum emulsion a ratio of 1 part of treating agent to 5,000 parts of emulsion will usually be found to produce commercially satisfactory results.

Having thus described my invention, what I claim as new and desire to secure by Letters Patent is:

1. A process for breaking petroleum emulsions of the water-in-oil type, which consists in subjecting the emulsion to the action of a demulsifying agent characterized by being derived by the conventional oxidation of a mixture of castor oil and sardine oil, in which mixture, castor oil constitutes 40 to 80% of the total.

2. A process for breaking petroleum emulsions of the water-in-oil type, which consists in subjecting the emulsion to the action of a demulsifying agent characterized by being derived by the conventional oxidation of a mixture of approximately 75% castor oil and approximately 25% sardine oil.

3. A process for breaking petroleum emulsions of the water-in-oil type, which consists in subjecting the emulsion to the action of a demulsifying agent characterized by being derived by the conventional oxidation of a mixture of approximately 75% castor oil and approximately 25% sardine oil, with the subsequent addition of a petroleum hydrocarbon distillate.

4. A process for breaking petroleum emulsions of the water-in-oil type, which consists in subjecting the emulsion to the action of a demulsifying agent characterized by being derived by the conventional oxidation of a mixture of approximately 75% castor oil and approximately 25% sardine oil, with the subsequent addition of kerosene.

5. A process for breaking petroleum emulsions of the water-in-oil type, which consists in subjecting the emulsion to the action of a demulsifying agent characterized by being derived by the conventional oxidation of a mixture of approximately 75% castor oil and approximately 25% sardine oil, with the addition of an approximately equal volume of kerosene.

6. A process for breaking petroleum emulsions of the water-in-oil type, which consists in subjecting the emulsion to the action of a demulsifying agent characterized by being derived by the conventional oxidation of a mixture of approximately 75% castor oil and approximately 25% sardine oil, with the addition of an approximately equal volume of kerosene, and followed by the addition of sufficient triethanolamine to neutralize any free acidic hydrogen.

CHARLES N. STEHR.